US 6,654,236 B2

(12) United States Patent
Chen et al.

(10) Patent No.: US 6,654,236 B2
(45) Date of Patent: Nov. 25, 2003

(54) COMPUTER ENCLOSURE WITH PIVOTING AND SLIDING OPENING MEANS

(75) Inventors: Jung-Chi Chen, Tu-Chen (TW); Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 24 days.

(21) Appl. No.: 10/107,683

(22) Filed: Mar. 26, 2002

(65) Prior Publication Data

US 2003/0137804 A1 Jul. 24, 2003

(30) Foreign Application Priority Data

Jan. 18, 2002 (TW) .................................... 91200439 U

(51) Int. Cl.[7] .................................................. G06F 1/20
(52) U.S. Cl. .................... 361/683; 361/681; 361/724; 312/223.1; 312/222; 292/80
(58) Field of Search ............................... 361/683, 684, 361/724, 725, 726, 727, 729, 682, 731, 741; 312/223.1, 223.2, 222, 223.6, 293.2, 290, 300, 111, 265.6; 220/323, 324, 784, 782, 786; 360/97.01, 98.01, 137, 137 D; 292/132, 175, 145, 163, 80, 164, 42, 33; 70/38 A, 38 C; G06F 1/16, 1/20

(56) References Cited

U.S. PATENT DOCUMENTS

| | | | | |
|---|---|---|---|---|
| 4,909,579 A | * | 3/1990 | Liu ........................... | 312/223.2 |
| 5,495,389 A | * | 2/1996 | Dewitt et al. ............... | 361/683 |
| 5,918,956 A | * | 7/1999 | Scholder ................... | 312/223.2 |
| 5,995,363 A | * | 11/1999 | Wu ............................ | 361/679 |
| 6,074,028 A | * | 6/2000 | Ho ............................ | 312/223.2 |
| 6,570,755 B2 | * | 5/2003 | Curlee et al. ............... | 361/683 |

OTHER PUBLICATIONS

Article "Lift mechanism " in the IBM Technical Disclosure Bulletin, vol. 29, Issue No. 7, pp. 3012–3013, Dec. 1, 1986.*

* cited by examiner

Primary Examiner—Michael Datskovsky
(74) Attorney, Agent, or Firm—Wei Te Chung

(57) ABSTRACT

A computer enclosure includes a base (10), a hood (40), a pair of rails (80), and a pair of locking devices (60). The base includes a bottom plate (12) and a pair of side plates (14, 16). A pair of slideways (24) is defined in the side plates. The hood includes a top cover (42) and a bezel (44) perpendicular to the top cover. A pair of pivot rods (46) extends inwardly from opposite sides of the bezel. Each rail includes a sliding part (82) and a pivoting part (84). The sliding parts are slidably received in the slideways. Each pivoting part defines a pivoting hole (92) therein for receiving a corresponding pivot rod. The locking devices lock the hood to the base.

16 Claims, 3 Drawing Sheets

COMPUTER ENCLOSURE WITH PIVOTING AND SLIDING OPENING MEANS

BACKGROUND OF THE INVENTION

1. Field of the Invention

The present invention relates to computer enclosures, and more particularly to a computer enclosure having pivoting means and sliding means so that the enclosure can be readily opened and closed to facilitate easy access to an interior of a computer equipped with the enclosure.

2. Description of Related Art

New computer components and accessories are continually being developed. This necessitates regular maintenance, renewal and upgrading of components and fittings of existing computers. Accordingly, a computer enclosure should readily allow access to an interior thereof.

A typical computer enclosure comprises a base, a front bezel and a cover, all of which are separate parts. In assembly, the bezel and the cover are directly secured to the base with screws. In order to remove the bezel or the cover, the screws must be disengaged from the base one by one. This is unduly laborious and time-consuming.

Taiwan Patent Application No. 83207001 discloses an alternative computer enclosure. The cover of the enclosure forms a plurality of locking members engaged with the base. The cover is thus secured to the base, and prevented from moving in vertical or lateral directions. Screws respectively attach a plurality of elastic members to the bezel. The elastic members deflectably extend through cutouts defined in front flanges of the cover and through holes defined in the base, thereby securing the bezel to the base. The front flanges of the cover are sandwiched between the bezel and the base. The cover is thus prevented from moving in forward or rearward directions.

To open the enclosure, the elastic members are removed from the through holes of the base and the cutouts of the cover. The bezel is thus detached from the base. The cover is then pushed to unlock the locking members. The cover is thus detached from the base. This procedure is unduly laborious and time-consuming.

It is strongly desired to provide an improved computer enclosure which overcomes the above-mentioned problems.

SUMMARY OF THE INVENTION

Accordingly, an object of the present invention is to provide an enclosure for a computer which can be readily opened and closed so that an interior of the computer can be easily accessed to proceed with maintenance or renewal of components in the computer.

In order to achieve the object set out above, a computer enclosure of the present invention comprises a base, a hood, a pair of rails and a pair of locking devices. The base comprises a bottom plate and a pair of side plates. A pair of slideways is defined in the side plates. The hood comprises a top cover and a bezel perpendicular to the top cover. A pair of pivot rods extends inwardly from opposite sides of the bezel. Each rail comprises a sliding part and a pivoting part. The sliding parts are slidably received in the slideways. Each pivoting part defines a pivoting hole therein for receiving a corresponding pivot rod. The locking devices lock the hood to the base.

Other objects, advantages and novel features of the present invention will become more apparent from the following detailed description when taken in conjunction with the accompanying drawings.

DETAILED DESCRIPTION OF THE INVENTION

Figure 1:
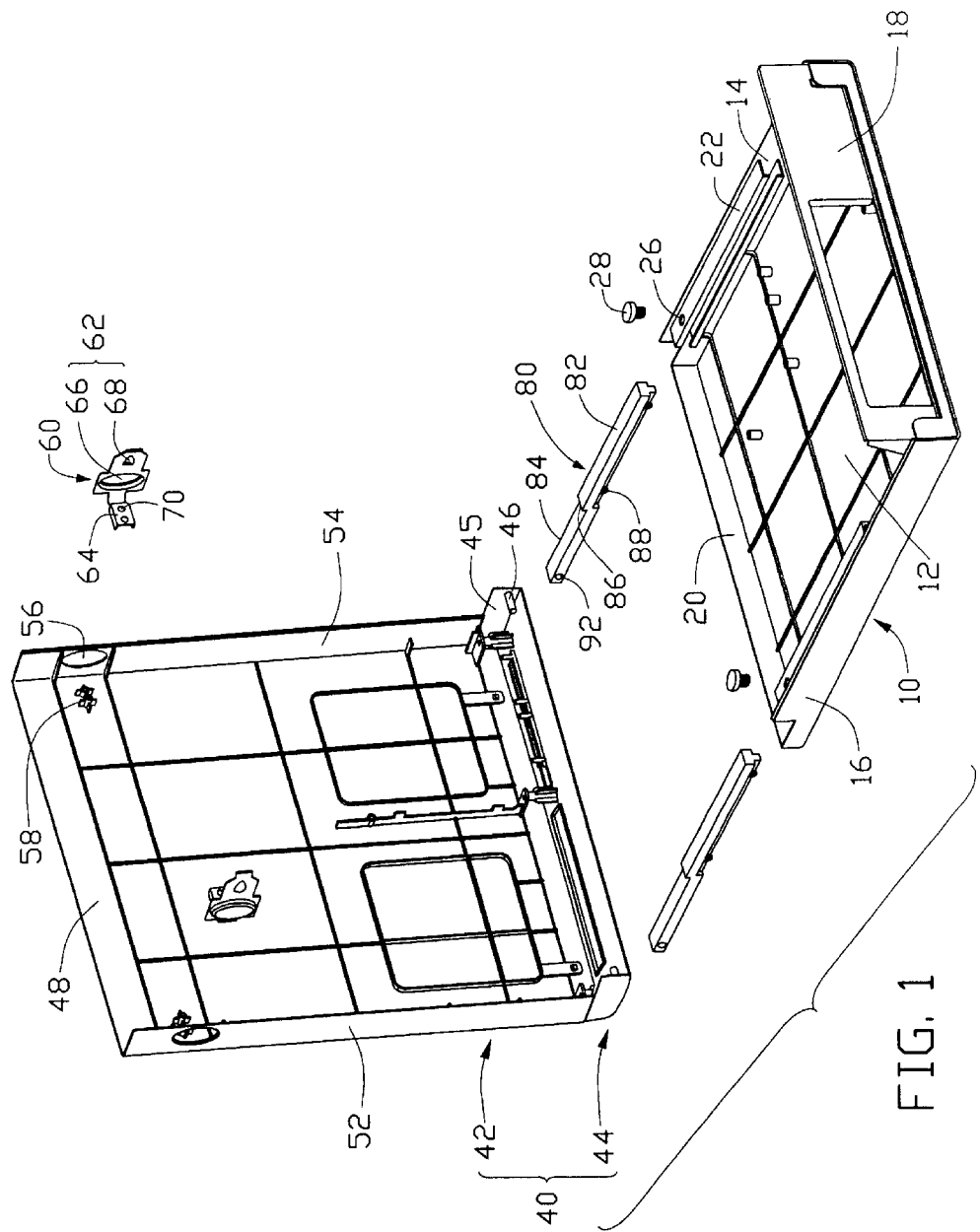
FIG. 1 is an exploded perspective view of a computer enclosure in accordance with a preferred embodiment of the present invention.

Reference will now be made to the drawing figures to describe the present invention in detail.

Referring to FIG. 1, a computer enclosure in accordance with a preferred embodiment of the present invention comprises a rectangular base 10, a hood 40, and a pair of rails 80.

Figure 2:
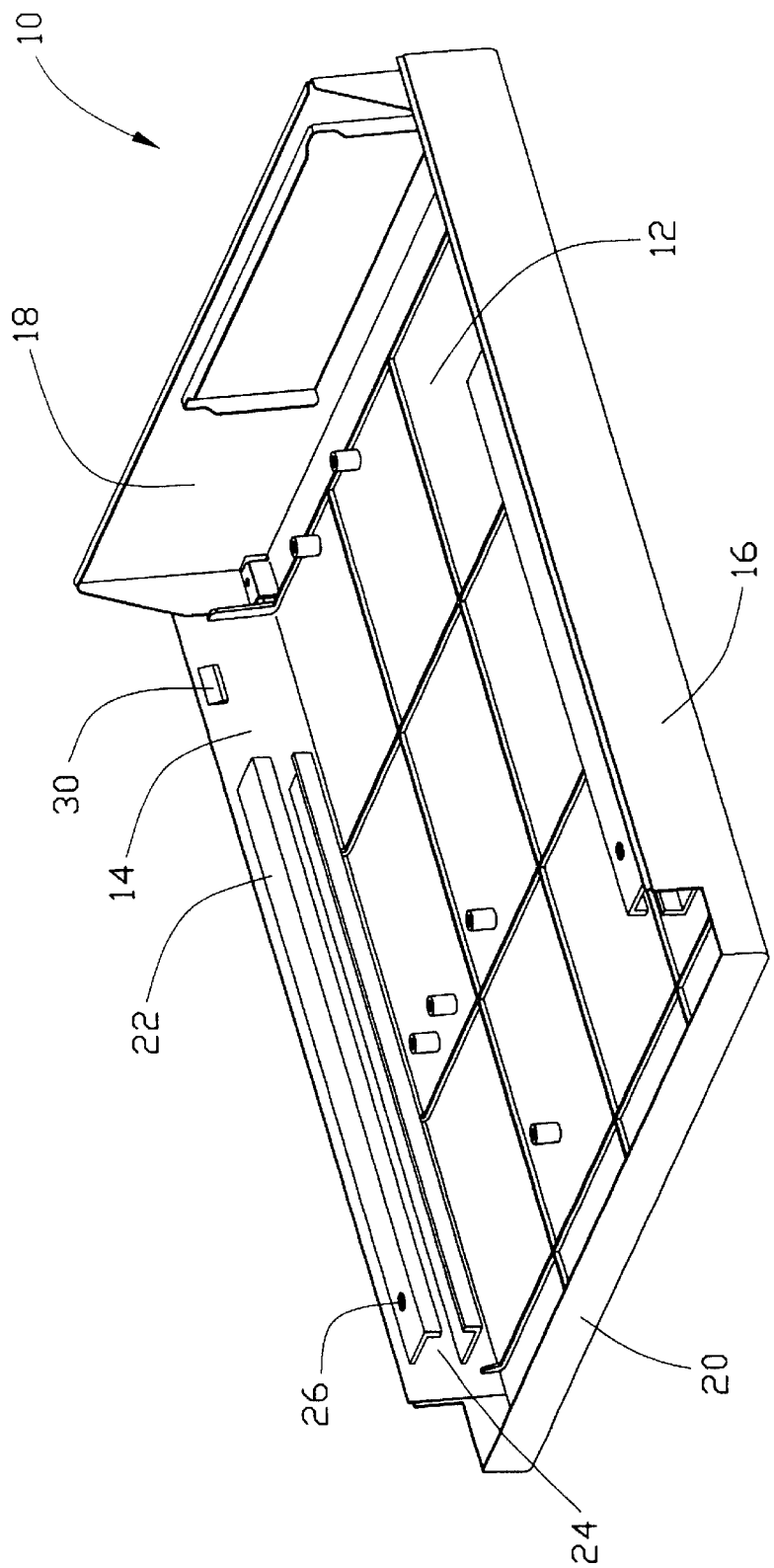
FIG. 2 is an enlarged perspective view of a base of the enclosure of FIG. 1, viewed from a different aspect.

Referring also to FIG. 2, the base 10 comprises a bottom plate 12, parallel first and second side plates 14, 16, a rear plate 18, and a front plate 20 parallel to the rear plate 18. The first and second side plates 14, 16, the rear plate 18 and the front plate 20 extend upwardly from respective edges of the bottom plate 12. The first side plate 14 inwardly forms a pair of flanges 22, each flange 22 having an L-shaped profile. The flanges 22 symmetrically oppose each other, one above the other. The first side plate 14 and flanges 22 thereby define a slideway 24 therebetween. A screw hole 26 is defined in the uppermost flange 22 near a front thereof, for receiving a screw 28 therein. A first protrusion 30 is inwardly formed from the first side plate 14 near the rear plate 18. The second side plate 16 has a structure which is the same as the structure of the first side plate 14, except that the structure of the second side plate 16 is a mirror image of the structure of the first side plate 14. Thus, a detailed description of the second side plate 16 is omitted herefrom for brevity.

The hood 40 comprises a top cover 42, a bezel 44, and a pair of locking devices 60. The bezel 44 is attached to an end of the top cover 42, and is generally perpendicular to the top cover 42. A pair of pivot rods 46 extends inwardly from opposite side flanges 45 of the bezel 44 respectively. The top cover 42 comprises a top plate 48, and a pair of sidewalls 52, 54 extending perpendicularly from the top plate 48. An aperture 56 is defined in each sidewall 52, 54 near an end thereof that is distal from the bezel 44. A pair of locating posts 58 is inwardly formed on the top plate 48, near the aperture 56 of the sidewall 52. Another pair of locating posts 58 is formed on the top plate 48, near the aperture 56 of the sidewall 54. The locating posts 58 respectively define threaded holes (not labeled) therein, for securing the locking devices 60 to the top cover 42.

Each locking device 60 comprises an elastic portion 62, and a locating tab 64 extending perpendicularly from an end of the elastic portion 62. A pressing button 66 is stamped outwardly from the elastic portion 62. A second protrusion 68 is outwardly formed from the elastic portion 62 between the pressing button 66 and an end of the elastic portion 62 that is distal from the locating tab 64, for engaging with the corresponding first protrusion 30 of the base 10. A pair of through holes 70 is defined in the locating tab 64, for extension of bolts (not shown) therethrough to secure the locking device 60 to the top cover 42.

Each rail 80 comprises a sliding part 82, a pivoting part 84 and a step 86 connecting the sliding part 82 and the pivoting part 84. The sliding part 82 has a generally T-shaped profile. A plurality of sliding wheels 88 is for facilitating sliding engagement of the sliding part 82 in the corresponding slideway 24 of the base 10. The step 86 extends downwardly from the sliding part 82 to the pivoting part 84. A pivoting hole 92 is defined in the pivoting part 84 near a free end thereof, for receiving a corresponding pivot rod 46 of the hood 40.

Figure 3:
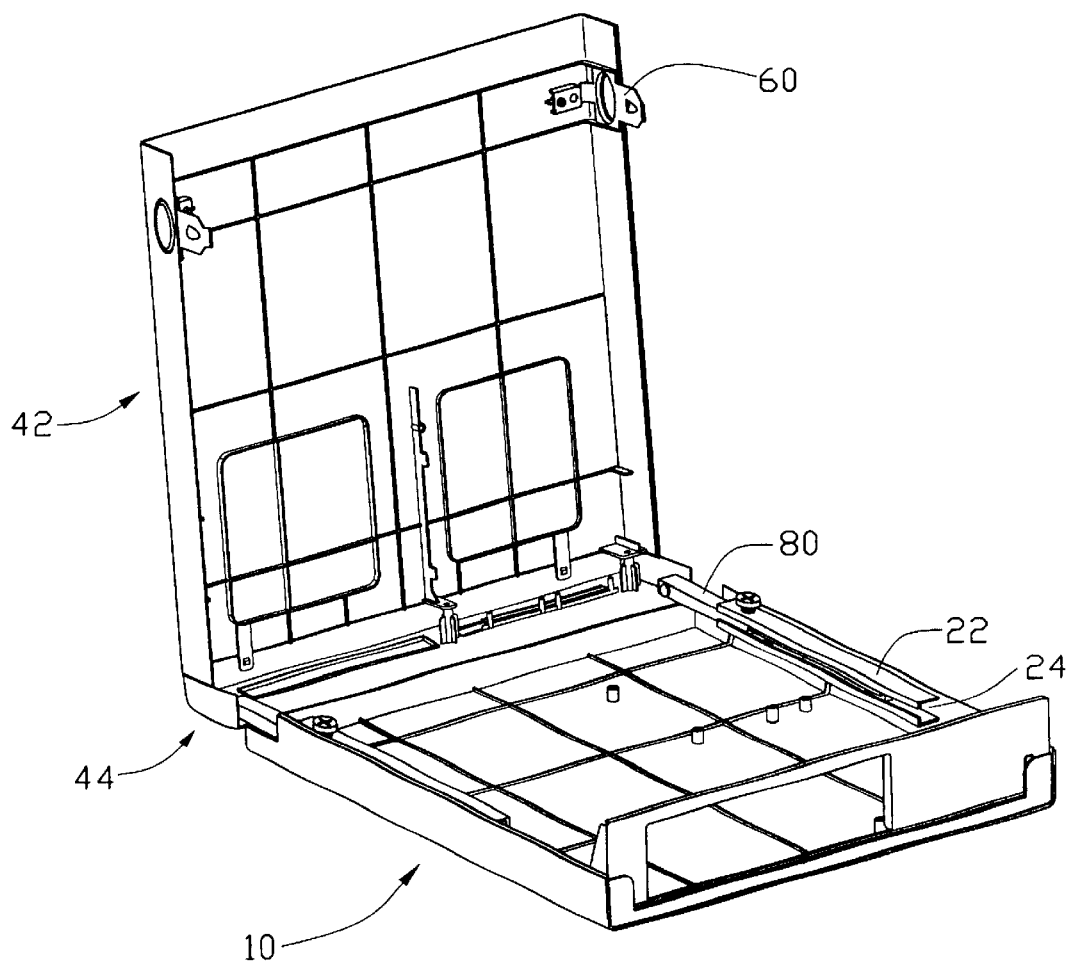
FIG. 3 is an assembled view of FIG. 1.

Referring also to FIG. 3, in assembly of the enclosure, the bolts (not shown) are extended through the through holes 70 of the locking devices 60 and engaged in the threaded holes (not labeled) of the locating posts 58 of the top cover 42. The locating tabs 64 of the locking devices 60 are thus secured to the locating posts 58. The pressing buttons 66 of the locking devices 60 are received in the apertures 56 of the sidewalls 52, 54 of the top cover 42. The pivot rods 46 of the side flanges 45 of the bezel 44 are pivotably received in the pivoting holes 92 of the rails 80. The hood 40 is thus pivotably connected to the rails 80. The sliding part 82 of each rail 80 is inserted into the corresponding slideway 24 of the base 10, with a plurality of the sliding wheels 88 being disposed in the slideway 24 on opposite sides of a lower portion of the sliding part 82. Thus, the rail 80 is smoothly slidable in the slideway 24. The screws 28 are screwed into the screw holes 26 of the base 10. The screws 28 prevent the steps 86 from moving out of the slideways 24. Thus the screws 28 prevent the rails 80 from sliding too far out from the base 10.

To close the enclosure, the sliding parts 82 of the rails 80 are slid in the slideways 24 toward the rear plate 18. The hood 40 is rotated about the pivot rods 46 downwardly onto the base 10 to a position in which the second protrusions 68 of the locking devices 60 are interlocked with the first protrusions 30 of the base 10. The hood 40 is thus securely engaged with the base 10.

To open the enclosure, the pressing buttons 66 are pressed inwardly. The elastic portions 62 are thus deflected inwardly until the second protrusions 68 of the locking devices 60 are released from the first protrusions 30 of the base 10. The bezel 44 is pulled forwardly, so that the sliding parts 82 of the rails 80 slide toward the screws 28. The hood 40 is rotated about the pivot rods 46 upwardly from the base 10. The enclosure is thus readily opened.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a base comprising a bottom plate, and a pair of side plates and a front plate all extending vertically from the bottom plate, a slideway being defined in the base at an inner side of each of the side plates;
   a hood comprising a cover and a bezel perpendicularly attached to an end of the cover, a pair of pivots extending inwardly from opposite sides of the bezel respectively;
   a pair of rails, each of the rails comprising a sliding part and a pivoting part, the sliding part being slidably received in a corresponding slideway of the base, the pivoting part defining a pivoting hole, the pivoting hole receiving a corresponding pivot of the hood therein; and
   a locking device locking the hood to the base.

2. The computer enclosure as claimed in claim 1, wherein each of the side plates inwardly forms an upper flange and a lower flange, the upper and lower flanges each have an L-shaped profile, and the upper and lower flanges symmetrically oppose each other to thereby define a corresponding slideway therebetween.

3. The computer enclosure as claimed in claim 2, wherein a screw hole is defined in the upper flange proximate to the front plate, and a screw is inserted in the screw hole, the screw being used for preventing a corresponding rail from escaping from the corresponding slideway.

4. The computer enclosure as claimed in claim 3, wherein each of the rails forms a step thereon, and the screw engages with the step to prevent the rails from escaping from the slideways.

5. The computer enclosure as claimed in claim 1, wherein the sliding part has a generally T-shaped profile.

6. The computer enclosure as claimed in claim 5, wherein a plurality of wheels is disposed on opposite sides of a lower portion of the sliding part.

7. The computer enclosure as claimed in claim 1, wherein a protrusion is formed on an inside of the base and is engaged with the locking device.

8. The computer enclosure as claimed in claim 1, wherein a locating member is inwardly formed from the cover, and the locking device is secured to the locating member.

9. The computer enclosure as claimed in claim 1, wherein the locking device comprises an elastic portion providing the locking device with resilient deformability, and a locating portion secured to the cover.

10. The computer enclosure as claimed in claim 9, wherein the elastic portion of the locking device forms a protrusion thereon.

11. The computer enclosure as claimed in claim 9, wherein a pressing button is stamped outwardly from the elastic portion between the locating member and the protrusion of the elastic portion, and an aperture is defined in the cover receiving the pressing button therein.

12. A computer enclosure comprising:
    a base having a front plate, a rear plate, and a pair of slideways extending generally from the front plate toward the rear plate;
    a pair of rails slideably received in the slideways, respectively;
    a hood having a front bezel pivotably connected to the rails;
    locking means for releasably locking the hood to the base at a position near the rear plate of the base; and
    locating means for preventing the rails from escaping from the slideways.

13. The computer enclosure as claimed in claim 12, wherein the locating means is located at a position near the front plate of the base.

14. The computer enclosure as claimed in claim 12, wherein the locking means comprises a locating tab secured to the hood, an elastic portion integrally extending perpendicularly from the locating tab, and a first protrusion formed on the base, the elastic portion having a second protrusion for engagement with the first protrusion, and a pressing button for releasing the engagement.

15. The computer enclosure as claimed in claim 14, wherein the pressing button is located between the second protrusion and the locating tab.

16. A method of disassembling a computer enclosure, comprising the steps of:
    providing a base with a bottom plate and two side plates by two sides of said bottom plate;
    disposing a pair of slideways on said two side plates in a front-to-back direction;
    providing a pair of rails moving along in the corresponding slideways, respectively;
    pivotally attaching a front end of a hood to front ends of the rails;
    attaching locking means to a rear end of the hood; wherein when disassembled, the locking means is released from the base, and then the hood is linearly moved in a back-to-front direction with guidable support between the slideways and the corresponding rails, and finally is rotated outwardly and forwardly to expose an interior of the enclosure.

* * * * *